2,709,675

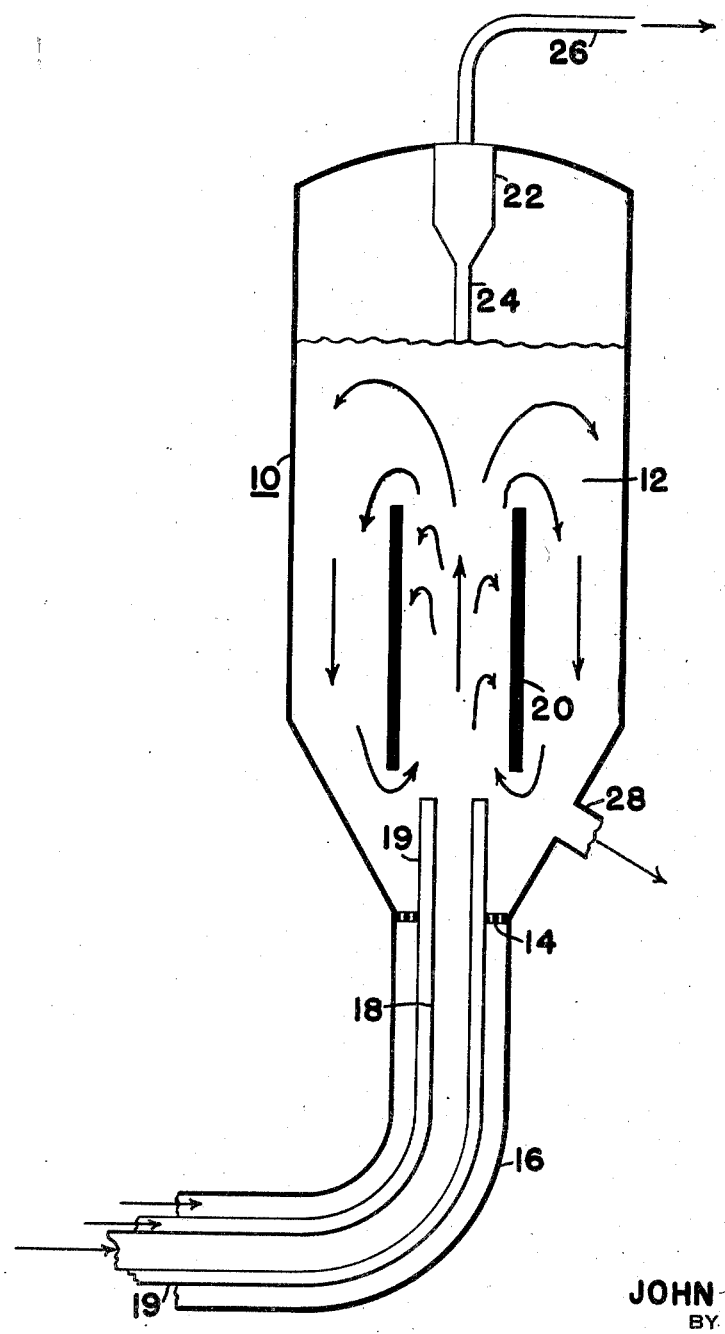
May 31, 1955 — J. A. PHINNEY — 2,709,675
TREATMENT OF AGGLOMERATIVE CARBONACEOUS SOLIDS
Filed April 16, 1949
INVENTOR
JOHN A. PHINNEY United States Patent Office 2,709,675
Patented May 31, 1955

TREATMENT OF AGGLOMERATIVE
CARBONACEOUS SOLIDS

John A. Phinney, Mount Lebanon, Pa., assignor to Pittsburgh Consolidation Coal Company, Pittsburgh, Pa., a corporation of Pennsylvania Application April 16, 1949, Serial No. 87,982

7 Claims. (Cl. 202—23)

This invention relates to the treatment of agglomerative hydrocarbonaceous solids and, more particularly, to a method and apparatus for distilling hydrocarbonaceous solids having a tendency to agglomerate when raised to an elevated temperature.

In the distillation of agglomerative hydrocarbonaceous solids such as coking bituminous coals, and the like, it is frequently found that the tendency of these solids, when heated, to soften and agglomerate results in loss of operability due to caking and decreased surface. These difficulties are found to be particularly troublesome in fluidized systems for distillation of such solids, since satisfactory fluidization depends largely upon the continued maintenance of finely divided discrete solid particles. While the agglomerating difficulties may be overcome if the carbonaceous solids are mixed with several times their weight of inert solids such as residue from previously distilled hydrocarbonaceous solids before subjecting the carbonaceous solids to distillation temperatures, such procedure is costly since it involves the addition of mechanical mixing equipment and may require the use of residue at a temperature below that of distillation.

The primary object of the present invention is to provide an improved method and apparatus for distilling agglomerating hydrocarbonaceous solids. Another object of this invention is to distill agglomerative hydrocarbonaceous solids in a fluidized system under such conditions that little or no agglomeration takes place. A still further object of the present invention is to provide a method and apparatus for introducing fresh agglomerative hydrocarbonaceous solids into a fluidized bed of carbonaceous solids which is maintained above the distillation temperature of the hydrocarbonaceous solids under such conditions that distillation of the fresh solids takes place before appreciable agglomeration results.

For a better understanding of this invention, reference should be had to the following description and to the attached drawing in which is diagrammatically illustrated a preferred embodiment of an apparatus for carrying out the method of my invention.

In accordance with my invention I have found that it is possible to prevent agglomeration in a fluidized bed of agglomerative hydrocarbonaceous solids by introducing fresh agglomerative carbonaceous solids into the bed under such conditions that the fresh solids are thoroughly and uniformly mixed with the previously distilled solids in the bed befor sufficient heat can be transferred to contiguous particles of the fresh feed to raise them to a temperature where they become plastic. When the fresh feed and the hot solids in the bed are thoroughly mixed before the plastic stage is reached, then little or no agglomeration results. My invention provides for introducing the fresh solid feed directly into the interior of the fluidized bed of carbonaceous solids being maintained above the distillation temperature. The introduction of the fresh feed is effected by means of a gaseous carrier moving at a high velocity (between 5 and 30 feet per second) so as to inject a stream of solids at a high rate into the fluidized bed. The concentration of the solids in the gas must also be between 0.5 and 10 pounds per cubic foot. In order to prevent the fresh solids from reaching a plastic stage during their passage through the fluidized bed to the point of injection, means are provided for cooling the stream of solids so as to maintain their temperature below the agglomeration temperature. As a result of the injection of the fresh feed at a high velocity at a point located interiorly of the bed a high degree of turbulence is produced at the point of injection. This causes the fresh feed to become thoroughly mixed with the hot solids of the fluidized bed in less time than is required for head to be transferred from the fluidized bed to the fresh feed. Consequently, sufficient inert material is mixed with the fresh feed to inhibit agglomeration when the fresh feed passes through the plastic zone.

If desired, a cylindrically shaped baffle may be disposed directly above the point of injection of the fresh feed. This baffle serves to establish a controlled path of circulation of the fresh feed as well as the distilled solids in the bed. This will be more fully explained in the following detailed description.

My invention is broadly applicable to the treatment of any agglomerative hydrocarbonaceous solids which contain volatilizable hydrocarbonaceous components and non-volatile carbonaceous components. Examples of such solids are coking bituminous coals, solid pitches, petroleum, or coal tar and the like. The range of temperatures over which the invention is applicable is the entire distillation range for the particular solids being treated and includes the so-called low, medium, and high temperature carbonization ranges. For purposes of illustration, the following detailed description is directed to a specific preferred embodiment of my invention, namely, the low temperature carbonization of strongly coking, high volatile, bituminous coal found in the Pittsburgh Seam.

Referring to the drawing, numeral 10 designates an elongated vertical vessel adapted to enclose a carbonization zone comprising a fluidized bed of solids 12. These solids comprise finely divided residue resulting from the previous carbonization or distillation of Pittsburgh Seam coal. A porous plate 14 serves to support the fluidized bed and to allow the passage of gas into the bed. In order to maintain the bed of solids in a fluidized state, gas is introduced into the vessel 10 and through the porous plate 14 by means of the conduit 16. This gas may be any inert gas such as nitrogen but preferably is recycle noncondensable gaseous product of the carbonization taking place in the vessel 10. The conditions required to produce fluidization of solids are well known in the art but by way of example the particle size of the solids in the bed 12 lie in the range 40 mesh to 10 microns and the velocity of the fluidizing gas lies between 0.1 to 2.0 feet per second.

The bed of fluidized solids is maintained at temperatures within the low temperature carbonization range of Pittsburgh Seam coal, namely 700° to 1600° F. A temperature range of 850° to 950° F. is preferred when maximum production of condensable products is desired. The necessary heat may be supplied by any one of several conventional methods. For example, the vessel 10 may be externally heated by means of heating units disposed outside or inside of the walls of the vessel 10 and in heat exchange relation therewith (not shown). Alternately, heat may be supplied by the circulation of preheated inert solids, such as recycled carbonization products through vessel 10.

As soon as the bed has reached the desired temperature, finely divided coal of particle size between 40 mesh and 10 microns are fed through conduit 18 which extends through the bottom of the vessel 10 and into the interior of the fluidized bed 12. The finely divided solids are carried by a non-oxidizing gas such as hydrogen, nitrogen, methane, steam and the like. A convenient source of suitable gas is the non-condensable portion of the products of carbonization which may be recycled through vessel 10. The velocity of the gas in this line should be between 5 and 30 feet per second and the concentration of the coal in the gas should be between 0.5 and 10 pounds per cubic foot. Preferably the velocity of the gas is between 10 and 15 feet per second and the concentration of the solids in the gas between 1 and 5 pounds per cubic foot. Under such conditions the stream of gas and fresh feed is injected into the interior of the fluidized bed at a high velocity with resulting high degree of turbulence. The fresh feed is immediately mixed with previously distilled coal before the fresh finely divided solids have attained the plastic temperature. This insures that little or no agglomeration takes place with the result that the operation of the fluidized bed is not impaired.

Since the stream of fresh finely divided solids passes through conduit 18, which is located within a portion of the fluidized heated bed, these solids may attain a temperature above the plastic point. I have, therefore, found it desirable to cool this stream during such passage through conduit 18 by cooling the walls of the conduit by means of the circulation of steam or other cooling media through concentrically disposed jacket 19. It is important that the stream of feed solids be maintained below the carbonization temperature, that is, in this instance below 700° F. before introduction into the fluidized bed. Jacket 19 of conduit 18 is suitably insulated externally to maintain its surface temperature at or near the desired carbonization temperature.

To further enhance the mixing of fresh feed with previously distilled coal, I have provided a cylindrically shaped baffle element 20 immediately above the outlet of the conduit 18. This baffle is supported in any convenient manner but is of such a height that its top is below the level of the fluidized bed. The injection of the stream of fresh solids and gas up through this chimney baffle establishes a differential fluid density between the outside and inside of the chimney with the result that high circulation is established past the point of fresh solid injection. The dimensions of the chimney are a function of the amount of injection gas, the particle size, and aerated density of the solids in the system. However, the cross-sectional area of the chimney should be such that the differential in density between the material outside of and within the chimney be not less than 1 and not more than 20 pounds per cubic foot, preferably about 5 to 10 pounds per cubic foot.

The gaseous products of carbonization along with the fluidizing gas are conducted from the carbonization vessel 10 through a cyclone separator 22, the separated solids being returned through the leg 24 to the fluidized bed. A conduit 26 serves to convey the products of carbonization to suitable treatment zones where tar and non-condensable gases are recovered. The carbonization residue produced in the carbonization vessel is removed from the bed through drawoff leg 28.

If desired, instead of a single injection conduit 18, a plurality of similar jacketed feed pipes may be arranged in the same horizontal plane or one above the other to further improve solids mixing.

According to the provisions of the patent statutes, I have explained the principle, preferred construction, and mode of operation of my invention and have illustrated and described what I now consider to represent its best embodiment. However, I desire to have it understood that, within the scope of the appended claims, the invention may be practiced otherwise than as specifically illustrated and described.

I claim:

1. The method of distilling agglomerative hydrocarbonaceous solids which comprises maintaining finely divided carbonaceous solids in a fluidized state in a distillation zone at a temperature above the distillation temperature of said agglomerative hydrocarbonaceous solids, injecting said agglomerative hydrocarbonaceous solids in finely divided form in a stream of gas directly into said fluidized bed at a point disposed interiorly of said bed, said stream of gas being separate from that employed to fluidize said solids, said solids at the point of entry into said bed being below the agglomerating temperature of the solids, and having a concentration in the gas between 0.5 pound and 10 pounds per cubic foot, maintaining the velocity of said stream of gas between five and thirty feet per second, said velocity being higher than that of the gas employed to fluidize said solids, whereby a zone of high localized turbulence is established at the interior point of injection of said carbonaceous solids, maintaining the temperature of the stream of gas and carbonaceous solids below the distillation temperature of the latter until the interior point of injection is reached, and recovering the products of distillation.

2. The method of distilling agglomerative hydrocarbonaceous solids which comprises circulating gas through a confined bed of finely divided carbonaceous solids under fluidizing conditions, heating said bed to a temperature sufficiently high to effect distillation of said agglomerative carbonaceous solids, conveying the latter solids in finely divided form in a stream of gas through a portion of said fluidized bed out of direct contact therewith into the interior thereof, said stream of gas being separate from that employed to fluidize said solids, cooling said stream of solids and gas during its travel through said portion to a temperature below the agglomerating temperature of the solids, injecting said stream of gas and solids directly into the interior of said bed at a gas velocity of five to thirty feet per second and with a concentration of solids in the gas between 0.5 and 10 pounds per cubic foot, said velocity being higher than that of the gas employed to fluidize said solids, whereby thorough and rapid mixing of the solids occurs without agglomeration, and recovering the products of distillation.

3. The method according to claim 2 wherein the agglomerative hydrocarbonaceous solids are highly coking high volatile bituminous coal.

4. The method of distilling agglomerative hydrocarbonaceous solids which comprises circulating a stream of gas through a confined bed of finely divided carbonaceous solids under fluidizing conditions, heating said bed to a temperature sufficiently high to effect distillation of said agglomerative solids, injecting finely divided agglomerative hydrocarbonaceous solids suspended in a second stream of gas into said fluidized bed at a point located interiorly of said bed and above the point of introduction of the fluidizing gas, the velocity of said second stream of gas being higher than that of said first mentioned fluidizing gas, maintaining the temperature of the agglomerative solids suspended in the second stream of gas below their agglomerating temperature until the interior point of injection is reached, and recovering the products of distillation.

5. The method of distilling agglomerative bituminous coal which comprises circulating a stream of gas through a confined bed of finely divided coal at a velocity between 0.1 and 2.0 feet per second to effect fluidization of said coal, heating said bed to a temperature sufficiently high to effect distillation of said coal, injecting fresh finely divided coal suspended in a second stream of gas into said fluidized bed at a point located interiorly of said bed and above the point of introduction of the fluidizing gas, said coal at the point of entry into said bed being below the agglomerating temperature of the coal and having a concentration in the gas between 0.5 and 10 pounds per cubic foot, maintaining the velocity of said second stream of gas between 5 and 30 feet per second, whereby a zone of high localized turbulence is established at the interior point of injection of said coal, maintaining the temperature of the coal suspended in the second stream of gas below the agglomeration temperature of the coal until the interior point of injection is reached, and recovering the products of distillation.

6. The method of distilling agglomerative hydrocarbonaceous solids which comprises circulating a stream of gas through a confined mass of finely divided carbonaceous solids under fluidizing conditions, heating said mass to a temperature sufficiently high to effect distillation of said agglomerative solids, injecting finely divided agglomerative hydrocarbonaceous solids suspended in a second stream of gas into said fluidized mass at a point located interiorly of said mass and above the point of introduction of the fluidizing gas, the velocity of said second stream of gas being adequate to create strong turbulence, maintaining the temperature of the agglomerative solids suspended in the second stream of gas below their agglomerating temperature until the interior point of injection is reached, and recovering the products of distillation.

7. The method of distilling agglomerative hydrocarbonaceous solids which comprises circulating a stream of gas through a confined mass of finely divided carbonaceous solids under fluidizing conditions, heating said mass to a temperature sufficiently high to effect distillation of said agglomerative solids, injecting a gas-solids suspension consisting of finely divided fresh agglomerative hydrocarbonaceous solids suspended in a second stream of gas into said fluidized mass at a point located interiorly of said mass, the velocity of said second stream of gas being adequate to create strong turbulence, circulating a cooling medium in heat exchange relation with said gas-solids suspension to cool said suspension to a temperature below the agglomerating temperature of said solids until the interior point of injection is reached, and recovering the products of distillation.

References Cited in the file of this patent

UNITED STATES PATENTS

| | | |
|---|---|---|
| 1,357,487 | Blass | Nov. 2, 1920 |
| 1,797,796 | Runge | Mar. 24, 1931 |
| 1,963,167 | Heller | June 19, 1934 |
| 1,983,943 | Odell | Dec. 11, 1934 |
| 2,367,351 | Hemminger | Jan. 16, 1945 |
| 2,378,342 | Voorhees et al. | June 12, 1945 |
| 2,445,327 | Keith | July 20, 1948 |
| 2,462,366 | Davies | Feb. 22, 1949 |
| 2,477,042 | Burnside | July 26, 1949 |

FOREIGN PATENTS

| | | |
|---|---|---|
| 1,091 | Great Britain | Nov. 12, 1903 |
| 578,711 | Great Britain | July 9, 1946 |
| 582,055 | Great Britain | Nov. 4, 1946 |
| 116,963 | Switzerland | Oct. 1, 1926 |
| 216,476 | Switzerland | Dec. 1, 1941 |